United States Patent Office 3,226,415 Patented Dec. 28, 1965

3,226,415
STABILIZED ORGANIC ISOCYANATES

Eric Smith, New Haven, Conn., assignor to Olin Mathieson Chemical Corporation, a corporation of Virginia No Drawing. Filed Apr. 22, 1963, Ser. No. 274,799
14 Claims. (Cl. 260—453)

This invention relates to organic isocyanate compounds stabilized against discoloring, and to the process for preparing them.

Organic isocyanates have been used extensively as a reactant in processes for the preparation of polyurethane surface coatings and the like. One problem encountered in such processes is that organic isocyanates, such as toluene diisocyanate, become discolored when stored for extended periods prior to use. The normally colorless isocyanate develops a deep yellow color after extended storage periods. One reason that such discolored organic isocyanates are undesirable is because they impart an undesirable yellow color to the resulting polyurethane surface coating. Various additives have been employed to stabilize the organic isocyanates against discoloring. However, in general, these additives are either too expensive because large proportions of the additives are required to effect the desired degree of stabilization, or else the additives are not effective for extended periods of storage.

It is a primary object of this invention to provide organic isocyanate compositions stabilized against discoloring.

Another object of the invention is to provide toluene diisocyanate compositions stabilized against discoloring.

A further object of the invention is to provide a process for stabilizing organic isocyanates against discoloring.

It is another object of the invention to provide a process for stabilizing toluene diisocyanate against discoloring.

These and other objects of the invention which overcome the disadvantages of the prior art will be apparent from the following detailed description of the invention.

It has now been discovered that the aforesaid objects can be accomplished when an organic isocyanate is admixed with a stabilizing proportion of a trihydroxy substituted benzoyl compound of the formula

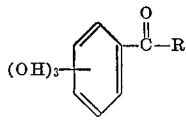

where R is selected from the group consisting of an alkyl radical containing between about 1 and about 6 carbon atoms, and an alkoxy radical containing between about 1 and about 6 carbon atoms.

Typical examples of suitable alkyl-substituted benzoyl compounds include the following:

2,4,5-trihydroxybutyrophenone
2,4,5-trihydroxyacetophenone
2,4,5-trihydroxypropiophenone
2,4,5-trihydroxypentanophenone
2,4,5-trihydroxyhexanophenone and the corresponding 3,4,5-trihydroxyalkylphenones.

Typical examples of suitable alkoxy-substituted benzoyl compounds include the following:

n-Methyl gallate
n-Ethyl gallate
n-Propyl gallate
n-Butyl gallate
n-Amyl gallate
n-Hexyl gallate and the corresponding 2,4,5-trihydroxy benzoates.

Sufficient benzoyl compound of the type discussed above is added to the organic isocyanate to stabilize it against discoloring. The stabilizing proportion is generally between about 10 and 2000 parts, and preferably between about 25 and about 1500 parts per million by weight of the organic isocyanate. However, any proportion of the benzoyl compound capable of effecting stabilization without adversely diluting the organic stabilizer may be employed.

The aforesaid benzoyl compounds are generally soluble in liquid organic isocyanates and can be readily admixed with liquid organic isocyanate simply by agitating the stabilizing proportion of the benzoyl compound in the organic isocyanate. When the organic isocyanate is a solid, it is heated to effect melting thereof and then admixed with the benzoyl compound until the stabilizer is dissolved.

Typical examples of organic isocyanates which can be stabilized in accordance with the technique of this invention include 2,4-toluene diisocyanate, 2,6-toluene diisocyanate, 4,4'-methylenediphenylisocyanate, 4,4'methylenediortho-tolylisocyanate, 2,4,4'-triisocyanatodiphenylether, toluene-2,4,6,-triisocyanate, 1-methoxy-2,4,6-benzenetriisocyanate, metaphenylenediisocyanate, 4-chloro-metaphenylenediisocyanate, 4,4'-biphenyldiisocyanate, 1,5-naphthalenediisocyanate, 1,4-tetramethylenediisocyanate, 1,6-hexamethylenediisocyanate, 1,10-decamethylenediisocyanate, 1,4-cyclohexanediisocyanate, 4,4'-methylene-bis-(cyclohexylisocyanate), 1,5-tetrahydronaphthalenediisocyanate, ortho-, meta- or para-tolueneisocyanate, alpha and beta-naphthyleneisocyanate, 4-methoxy-meta-phenylenediisocyanate, and the like.

Organic isocyanate stabilized in accordance with the technique of this invention can be stored for several months without appreciable discoloring.

The following examples are presented to further illustrate the invention without any intention of being limited thereby. All parts and percentages are by weight unless otherwise specified.

*Examples I–III*

Five vials having a capacity of 16 milliliters were employed in carrying out these examples. The vials were cleaned, dried and the screw caps were lined with aluminum foil. Each vial was filled with 10 milliliters (12.2 grams) of colorless toluene diisocyanate which contained 80 percent 2,4-toluene diisocyante and 20 percent 2,6-toluene diisocyante. To each of three vials was added one bonzoyl stabilizer compound in the proportion indicated below in the table. The contents of the vials were heated to about 80° C. for about 30 minutes to dissolve the solid stabilizers and then cooled under nitrogen to room temperature. The nitrogen in the vials was replaced with air and the vials were recapped. No stabilizer was added to two of the vials. After securing the caps to the vials they were allowed to stand at room tempearture for the period indicated in the table. The table also sets forth the color of the sample obtained after storage.

| Example | Stabilizer | Proportion of Stabilizer, Grams | Storage Period, Days | Appearance After Storage Period |
|---|---|---|---|---|
| I | n-propyl gallate | 0.0129 | 35 | Colorless. |
| II | do | 0.0123 | 24 | Do. |
| III | 2,4,5-trihydroxybutyrophenone. | 0.0123 | 28 | Do. |

For purposes of comparison, the two vials to which no stabilizer had been added were all discolored with a yellow color after standing 2½ days.

*Example IV*

To determine the effectiveness of a trihydroxy substituted benzoyl compound as a stabilizer for toluene diisocyante in the presence of fluorescent light, one sample of toluene diisocyanate containing 2,4,5-trihydroxybutyrophenone was stored in an 8-ounce clear bottle under fluorescent light at a distance of about 8 feet from the light source for a period of about 80 days. The bottle was shielded against sunlight so that the effect of the fluorescent light could be established. The concentration of the stabilizer was 50 parts per million.

After storing the sample for about 80 days, the color was determined in accordance with the procedure set forth in ATSM D1638–61T wherein the color is compared with various concentrations of aqueous solutions of potassium chloroplatinate. In this method aqueous solutions of various concentrations of a standard solution prepared from potassium chloroplatinate, hydrochloric acid, cobaltous chloride, and water are prepared, the lower number representing the lower concentration of the standard solution. The sample to be measured was then compared with the various standard solutions and found to have a color number of about 15. For purposes of comparison a control sample which contained no stabilizer was stored under the same conditions and was found to have a color number of about 45.

Various modifications of the invention may be employed without departing from the spirit of the invention.

I claim:

1. An organic isocyante containing a stabilizing proportion of a trihydroxy-substituted benzoyl compound of the formula

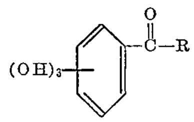

where R is selected from the group consisting of an alkyl radical containing between 1 and 6 carbon atoms, and an alkoxy radical containing between 1 and 6 carbon atoms.

2. The composition of claim 1 wherein the stabilizing proportion of said benzoyl compound is between about 10 and about 2000 parts per million by weight.

3. The composition of claim 1 wherein the stabilizing proportion of said benzoyl compound is between about 25 and about 1500 parts per million by weight.

4. The composition of claim 1 wherein R in the formula for said benzoyl compound is an alkyl radical containing between 1 and 6 carbon atoms.

5. The composition of claim 1 wherein said benzoyl compound is n-propyl gallate.

6. The composition of claim 1 wherein said benzoyl compound is n-hexyl gallate.

7. The composition of claim 1 wherein R in the formula for said benzoyl compound is an alkoxy radical containing between 1 and 6 carbon atoms.

8. The composition of claim 1 wherein said bonzoyl compound is 2,4,5-trihydroxybutyrophenone.

9. The composition of claim 1 wherein said benzoyl compound is 2,4,5-trihydroxyacetophenone.

10. The composition of claim 1 wherein said benzoyl compound is 2,4,5-trihydroxyhexanophenone.

11. The composition of claim 1 wherein said organic isocyanate is toluene diisocyanate.

12. Toluene diisocyanate stabilized against discoloring comprised of toluene diisocyanate containing a stabilizing proportion of n-propyl gallate.

13. Toluene diisocyanate stabilized against discoloring comprised of toluene diisocyante containing a stabilizing proportion of n-hexyl gallate.

14. Toluene diisocyanate stabilized against discoloring comprised of toluene diisocyanate containing a stabilizing proportion of 2,4,5-trihydroxybutyrophenone.

References Cited by the Examiner

UNITED STATES PATENTS 2,568,894 9/1951 Mackey ------------ 252—300
2,686,812 8/1954 Wynn et al. -------- 252—300

CHARLES B. PARKER, *Primary Examiner.*